(12) United States Patent
Stentz et al.

(10) Patent No.: US 7,019,894 B1
(45) Date of Patent: Mar. 28, 2006

(54) OPTICAL AMPLIFIER HAVING AUTOMATIC GAIN CONTROL USING THE AMPLIFIED SPONTANEOUS EMISSION AS THE MONITORING PARAMETER

(75) Inventors: Andrew John Stentz, Clinton, NJ (US); Thomas C. Jones, Belford, NJ (US); Kenneth R. Roberts, Little Silver, NJ (US); Stephen W. Granlund, Macungie, PA (US)

(73) Assignee: Meriton Networks US Inc., Wilmington, DE (US)

( * ) Notice: Subject to any disclaimer, the term of this patent is extended or adjusted under 35 U.S.C. 154(b) by 223 days.

(21) Appl. No.: 10/386,902

(22) Filed: Mar. 11, 2003

(51) Int. Cl.
*H04B 10/12* (2006.01)
(52) U.S. Cl. ................................. 359/341.41
(58) Field of Classification Search ............ 359/341.41
See application file for complete search history.

(56) References Cited

U.S. PATENT DOCUMENTS

| 6,337,764 | B1* | 1/2002 | Yoon et al. ............ 359/341.41 |
| 6,456,428 | B1* | 9/2002 | Nakaji et al. .......... 359/341.41 |
| 6,519,081 | B1* | 2/2003 | Lelic et al. ............... 359/341.4 |
| 6,535,330 | B1* | 3/2003 | Lelic et al. ............ 359/337.13 |
| 6,714,343 | B1* | 3/2004 | Goobar et al. ............... 359/337 |
| 6,934,076 | B1* | 8/2005 | Goobar et al. ............... 359/337 |
| 2001/0040720 | A1* | 11/2001 | Gerrish et al. ........... 359/341.4 |
| 2001/0040721 | A1* | 11/2001 | Gerrish et al. ......... 359/341.41 |

OTHER PUBLICATIONS

Yoon et al., "Reference level free multichannel gain equalization and transient gain suppression of EDFA with differential ASE power monitoring", IEEE Photonics Technology Letters, vol. 11, No. 3, pp. 316-318 (Mar. 1999).*

* cited by examiner

*Primary Examiner*—Jack Keith
*Assistant Examiner*—Eric Bolda
(74) *Attorney, Agent, or Firm*—Mayer & Williams PC; Stuart H. Mayer, Esq.; Karin L. Williams, Esq.

(57) ABSTRACT

A method and apparatus for automatically controlling the gain of an optical amplifier. The method begins by establishing a setpoint for ASE power within a given wavelength range generated by the optical amplifier. The pump power supplied to the optical amplifier is adjusted to maintain the ASE power at the established setpoint. The setpoint for the ASE power is adjusted based at least in part on changes in signal input power.

39 Claims, 5 Drawing Sheets

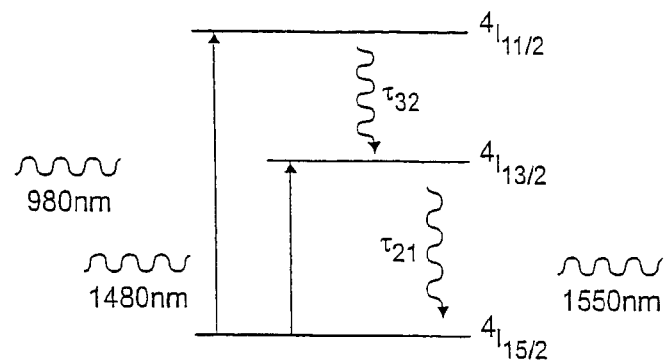
SCHEMATIC ILLUSTRATION OF THE
RELEVANT ENERGY LEVELS OF ERBIUM IONS
FIG. 1
PRIOR ART
FIG. 3
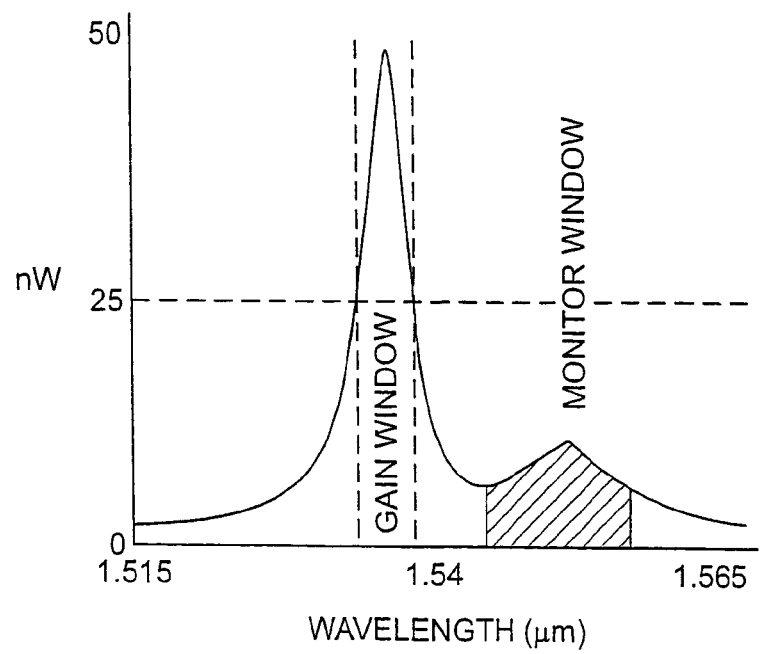

OPTICAL AMPLIFIER HAVING AUTOMATIC GAIN CONTROL USING THE AMPLIFIED SPONTANEOUS EMISSION AS THE MONITORING PARAMETER

FIELD OF THE INVENTION

The present invention relates generally to optical amplifiers, and more particularly to optical amplifiers that employ automatic gain control.

BACKGROUND OF THE INVENTION

In a WDM transmission system, two or more optical data carrying channels, each defined by a different carrier wavelength, are combined onto a common path for transmission to a remote receiver. The carrier wavelengths are sufficiently separated so that they do not overlap in the frequency domain. The multiplexed channels are demultiplexed at the receiver in the optical and possibly also in the electrical domain. Demultiplexing in the optical domain requires using frequency-selective components such as optical gratings or bandpass filters. Typically, in a long-haul optical fiber system, an optical amplifier would amplify the set of wavelength channels simultaneously, usually after traversing distances less than about 120 km.

One class of optical amplifiers is rare-earth doped optical amplifiers, which use rare-earth ions as the active element. The ions are doped in the fiber core and pumped optically to provide gain. The silica fiber core serves as the host medium for the ions. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimal. Also, the erbium-doped fiber amplifier is particularly useful because of its ability to amplify multiple wavelength channels without crosstalk penalty, even when operating deep in gain compression. EDFAs are also attractive because they are fiber devices and thus can be easily connected to telecommunications fiber with low loss.

FIG. 1 shows an energy level diagram for the $Er^{+3}$ system in silica fiber. As shown, light of wavelength 980 nm is absorbed by the erbium ions, exciting the ions to the higher energy state $^4I_{11/2}$. This excited state rapidly decays (with a time constant $\tau_{32}$ of about 10 microseconds) to the metastable state $^4I_{13/2}$ without radiative emission. The metastable state alternatively may be reached by the absorption of light at 1480 nm, which corresponds to the upper edge of the band defining the metastable state. The metastable state deexcites by emitting photons at different wavelengths, with peak photon emission occurring at about 1530 nm. This deexcitation may occur spontaneously or by stimulated emission with an optical signal having a wavelength around 1530 nm. Since the metastable state is relatively long-lived (with a time constant $\tau_{21}$ of about 10 milliseconds), stimulated emission is much more likely to occur than spontaneous emission under typical operating conditions. Stimulated emission causes amplification of the optical signal that induced the stimulated emission.

The signal power directed to the input of an optical amplifier employed in an optical communication network can vary for a large number of reasons. For example, power variations can be caused by an intentional increase or decrease in the number of channels for the purpose of routing traffic, by the unintentional loss of channels due to a fiber cut or human error, changes in span losses, and component loss changes due to aging or temperature fluctuations. Additionally, in packet-switched networks, the traffic pattern is often fractured in time where there may be substantial time delays between packets transmitted over the network. Such networks see some periods of source inactivity followed by sudden periods of traffic bursts. Consequently, the network is prone to power fluctuations in time on the optical line. With a constant pump power, channels passing through an optical amplifier operating in saturation become coupled due to the population inversion and pump dynamics of the amplifier. When channels are dropped or added the power in those channels is transferred to or taken from the power of the remaining channels. Similarly, in packet-switched networks, the packets passing through the optical amplifier may be amplified to different power levels depending on the time spacing between packets, i.e., after a period of inactivity, the first packet through the amplifier will have a much larger power than the last packet through. Both types of events lead to power excursions on the optical channels that build at every node and may eventually surpass the nonlinearity limits or push the channel powers or optical signal to noise ratios out of the dynamic range of the downstream receivers.

Because of the aforementioned problems it is important to maintain a constant amplifier gain as the input power changes. This type of control is commonly referred to as automatic gain control (AGC) or transient control. It is well known that AGC can be achieved by adjusting the pump power supplied to the amplifier. In general, the required change in pump power depends not only on the input signal power level but also on the spectral content of the input signal. Most AGC algorithms consist of three parts: (i) detection of a change in the monitoring parameters; (ii) generation of an error signal; and (iii) modification of the control parameters to return the error signal to zero. With AGC the gain of the amplifier at a particular optical frequency, v, is held constant such that:

$$a. \quad \frac{P^{out}(v)}{P^{in}(v)} = G(v) = const. \quad (1)$$

where $P^{out}(v)$ is the output signal power at frequency (v), $P^{in}(v)$ is the input signal power at frequency v, and G(v) is the gain at frequency v.

A well-known technique for implementing AGC by controlling pump power is a feedback arrangement in which the parameters used to determine the appropriate pump power include the input and output optical signals, which are used to determine the actual gain of the amplifier. This measured gain may then be used to adjust the pump power until the desired gain is achieved. For example, FIG. 2 shows an optical amplifier with such a feedback control. The arrangement of FIG. 2 comprises an erbium doped fiber 1, a pump laser 2, a wavelength multiplexer 3 which multiplexes the pump laser output and an input optical signal which is to be amplified and is input at port 4, an input signal tap 12, which serves to split off a small portion of the input signal to doped fiber 1, an output signal tap 5, which serves to split off a small portion of the total output signal, an output port 6 for receiving the amplified optical signal, detectors 8 and 14, electronic amplifiers 9 and 16 and a feedback circuit 10.

In operation, the optical signal to be amplified is input via port 4 of multiplexer 3, multiplexed with the optical pump signal output from laser 2 and amplified in the erbium doped fiber 1. Tap 12, which may be a fused fiber coupler, for example, splits off a small proportion of the signal input to the fiber 1. This small part of the amplified signal, which is employed as a control signal, is detected by detector 14, amplified by electronic amplifier 16 and applied to the feedback circuit 10. Likewise, tap 5, which may also be a fused fiber coupler, for example, splits off a small proportion of the total output power from fiber 1. This small part of the output power, which also serves as a control signal, is detected by detector 8, amplified by amplifier 9 and applied to the feedback circuit 10. Feedback circuit 10 determines the amplifier gain based on the two control signals it receives. In some cases, an estimate of the ASE power generated by the amplifier for a given gain is subtracted from the total output power to more accurately determine the signal output power. The output from the feedback circuit 10 is applied to the pump laser 2 and serves to vary the pump laser 2 output power to maintain constant gain.

One variant of the feedback arrangement shown in FIG. 2 employs the amplified spontaneous emission (ASE) rather than the optical signal power itself as the control signal. As is well known, all optical amplifiers generate ASE. As shown in FIG. 3, conventional "C-band" erbium amplifiers provide substantial gain in the range of 1529–1564 nm. Likewise, the ASE is strongest over this same wavelength range because the ASE power is directly proportional to amplifier gain. That is, the intensity of the amplified spontaneous emission from the amplifier is dependent on amplifier gain, and thus, a measure of ASE provides an indirect measure of the amplifier gain. Accordingly, one or more wavelengths within the 1529–1564 nm range may be reserved for measuring ASE at that wavelength. For example, in FIG. 3, ASE is measured at a wavelength of 1.551 microns, which can therefore be used to form the basis of a gain control loop of the form illustrated in FIG. 4.

In FIGS. 2 and 4, like elements are denoted by like reference numerals. In FIG. 4, however, coupler 5 is now a wavelength selective coupler that splits off a small portion of the ASE. Thus, in this arrangement the amplifier gain is monitored by monitoring the ASE over the wavelengths demultiplexed by coupler 5, which is used by the feedback loop to keep the amplifier gain constant by varying the pump power accordingly.

The previously discussed feedback arrangement for providing an optical amplifier with AGC in which the ASE is used as the control signal has a significant disadvantage. In particular, this technique assumes that the power of the ASE scales with the amplifier gain for all signal input powers so that a constant ASE power implies a constant gain. Unfortunately, this is generally not the case for all signal input powers because of variations in the noise figure of the amplifier at different signal input powers. As a result, there may be a change in the amplifier gain even while the ASE remains constant.

Accordingly, there is a need for an optical amplifier having an improved automatic gain control arrangement where the ASE is used as the control signal.

SUMMARY OF THE INVENTION

The present invention provides a method and apparatus for automatically controlling the gain of an optical amplifier. The method begins by establishing a setpoint for ASE power within a given wavelength range generated by the optical amplifier. The pump power supplied to the optical amplifier is adjusted to maintain the ASE power at the established setpoint. The setpoint for the ASE power is adjusted based at least in part on changes in signal input power.

In accordance with one aspect of the invention, a control signal is generated based on a feedback error signal and the pump power is adjusted in accordance with the control signal.

In accordance with another aspect of the invention, the feedback error signal is proportional to the difference between the setpoint for the ASE power and the power of ASE received at an output of the optical amplifier.

In accordance with another aspect of the invention, the step of adjusting the ASE power setpoint includes the step of adjusting the ASE power setpoint so that a substantially constant optical amplifier gain is maintained.

In accordance with another aspect of the invention, the setpoint for the ASE power is higher at low signal input powers and lower at high signal input powers.

In accordance with another aspect of the invention, the setpoint for the ASE power is continuously adjustable. Alternatively, the setpoint for the ASE power is adjustable in a fixed number of discrete increments.

In accordance with another aspect of the invention, the step of adjusting the ASE power setpoint includes the step of adjusting the ASE power setpoint at no more than a prescribed rate. The prescribed rate may be different when the signal input power increases rather than decreases.

In accordance with another aspect of the invention, an optical amplifier with automatic gain control is provided. The optical amplifier includes a rare-earth doped fiber for imparting gain to an optical signal propagating therethrough, a pump source for supplying pump power to the rare-earth doped fiber, and a first optical power monitoring device for receiving a portion of ASE generated by the rare-earth doped fiber and converting the portion of the ASE to a first control signal. The amplifier also includes a second optical power monitoring device for receiving a portion of the input optical signal and converting the portion of the input optical signal to a second control signal. A controller receives the first and second control signals and generates a bias current for driving the pump source. The bias current has a value based on maintaining the first control signal at a selected value that is based at least in part on the value of the second control signal.

In accordance with another aspect of the invention, the controller is a PID controller.

In accordance with another aspect of the invention, the first optical power monitoring device includes a first coupler located at the output of the doped fiber and a first photodetector for converting the portion of the ASE power to the first control signal.

In accordance with another aspect of the invention, the second optical power monitoring device includes a second coupler located at the input of the doped fiber and a second photodetector for converting the portion of the input power to the second control signal.

In accordance with another aspect of the invention, the selected value at which the control signal is maintained is chosen so that a substantially constant optical amplifier gain is maintained.

BRIEF DESCRIPTION OF THE DRAWINGS

FIG. 1 shows an energy level diagram for the $Er^{+3}$ system.

FIG. 3 shows the ASE spectrum for an erbium-doped fiber amplifier.

DETAILED DESCRIPTION

The present invention provides an optical amplifier with a feedback AGC algorithm that uses the amplified spontaneous emission (ASE) generated within the amplifier as the monitoring parameter and the pump power as the control parameter. The ASE power at optical frequency, ν, is given by:

$$P_{ASE}(\nu) \cong F_N(\nu)G(\nu)h\,\nu\Delta\nu \qquad (2)$$

where $F_N(\nu)$ is the noise figure at frequency ν, $G(\nu)$ is the gain at frequency ν, which is assumed to be much greater than 1, h is Planck's constant, ν is the optical frequency, and $\Delta\nu$ is the optical bandwidth over which the ASE power is measured.

Figure 2:
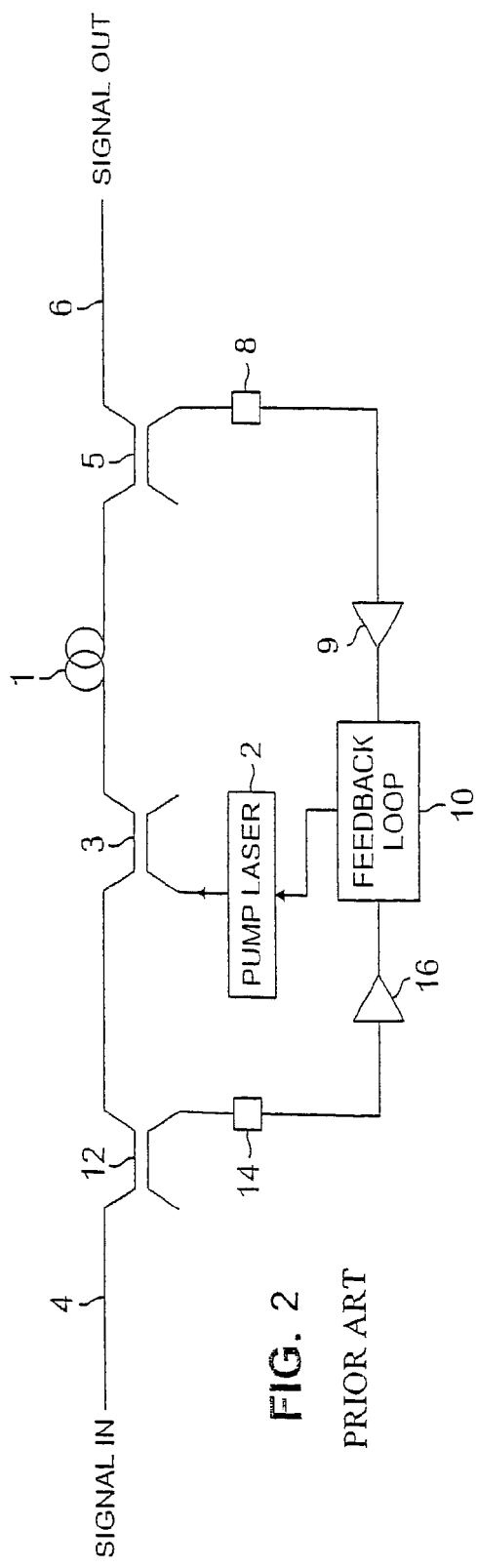
FIG. 2 shows a conventional optical amplifier with feedback control utilizing input and output taps.
Figure 4:
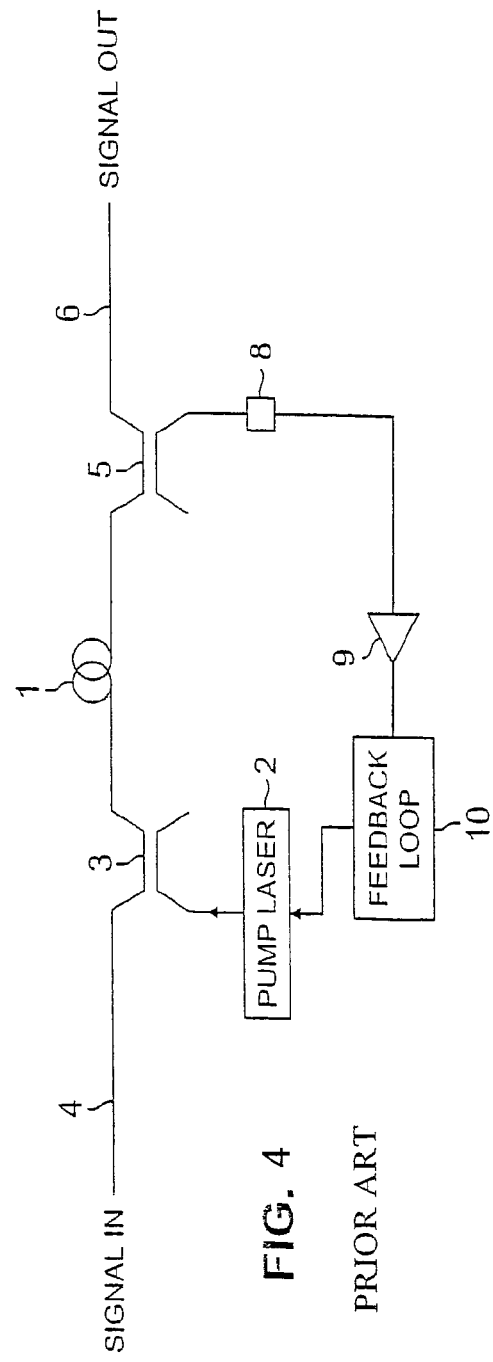
FIG. 4 shows another conventional optical amplifier with feedback control that employs ASE as the basis for controlling gain.
Figure 5:
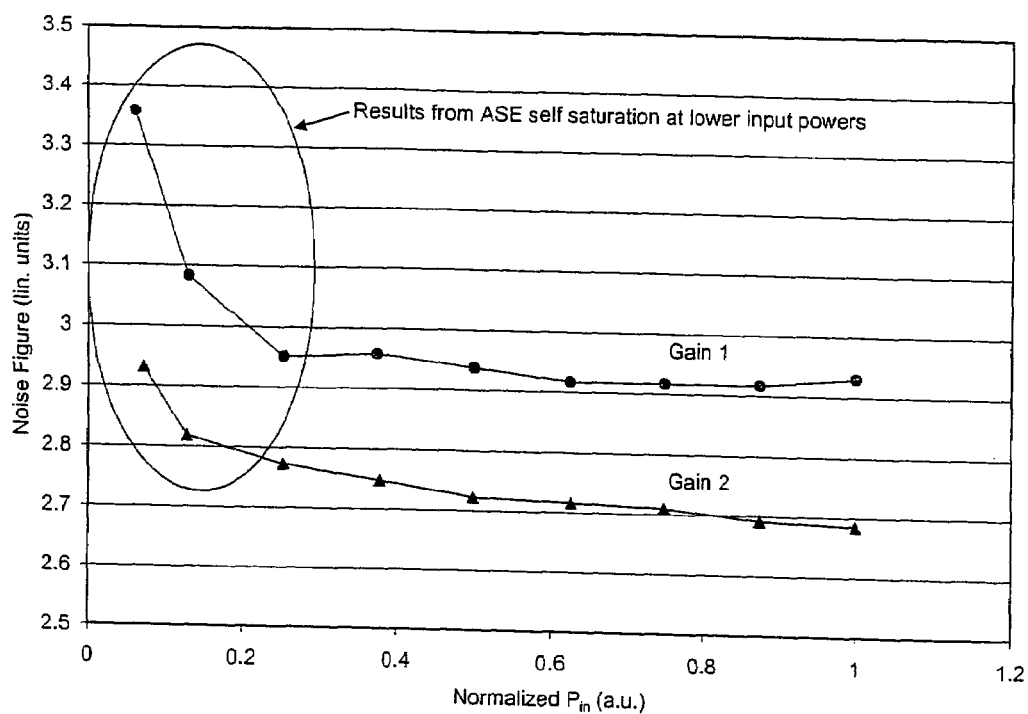
FIG. 5 shows the noise figure of an optical amplifier as a function of the signal input power.

The noise figure of the amplifier is a function of the input power level due to ASE self-saturation. For small signal input powers the backward traveling ASE in the amplifier depletes the inversion at the front of the amplifier, which leads to a higher noise figure for the amplifier. As the signal input power is increased, the signal depletes the inversion near the front of the amplifier, thereby reducing the gain of the backward traveling ASE. As shown in FIG. 5, this results in a lower noise figure at higher input powers. The error generated by monitoring the ASE power is then:

$$\begin{aligned}\varepsilon(\nu, t) &= P_{ASE}(\nu, t) - P_{ASE}(\nu, t=0) \qquad (3)\\ &= F_N(\nu, t)G(\nu, t)h\nu\Delta\nu - F_N(\nu, t=0)G(\nu, t=0)h\nu\Delta\nu\\ &= (F_N(\nu, t)G(\nu, t) - F_N(\nu, t=0)G(\nu, t=0))h\nu\Delta\nu\end{aligned}$$

where t=0 defines the moment in time just before a transient event takes place.

Because of the variations in the noise figure there may be changes in the gain of the amplifier even as the ASE power remains constant. In other words, as $F_N$ increases due to signal input power changes from a transient event, the gain G must decrease to keep $P_{ASE}$ constant (see Equation 2). Thus, the gain of the amplifier will not be held constant if the control circuit adjusts the amplifier operating conditions until ε(t)=0 and the ASE error signal defined in Equation (3) is used as the control parameter. Rather, the surviving channels will experience a gain offset, ΔG, defined as:

$$\Delta G = \frac{G(t=\infty)}{G(t=0)} = \frac{F_N(t=0)}{F_N(t=\infty)}. \qquad (4)$$

Similar to power excursions, gain offsets serve to degrade the signal. Namely, gain offsets cause power offsets on the optical channels that build at every node. It is possible, then, that channel powers will eventually surpass the nonlinearity limits or walk out of the dynamic range of the downstream receivers. Thus, minimizing the gain offset is just as important as minimizing the power excursion.

To reduce or even eliminate the gain offset the present invention monitors both the signal input power and the ASE power. Conventional automatic gain control arrangements that employ the ASE as the monitoring parameter simply establish a setpoint for the ASE power that must be maintained. In contrast, the present invention establishes a series of ASE setpoints that are determined by the value of the signal input power. That is, the setpoint of the ASE power will vary as the signal input power varies. For instance, at low signal input powers the setpoint of the ASE power will be higher than at higher signal input powers.

Figure 6:
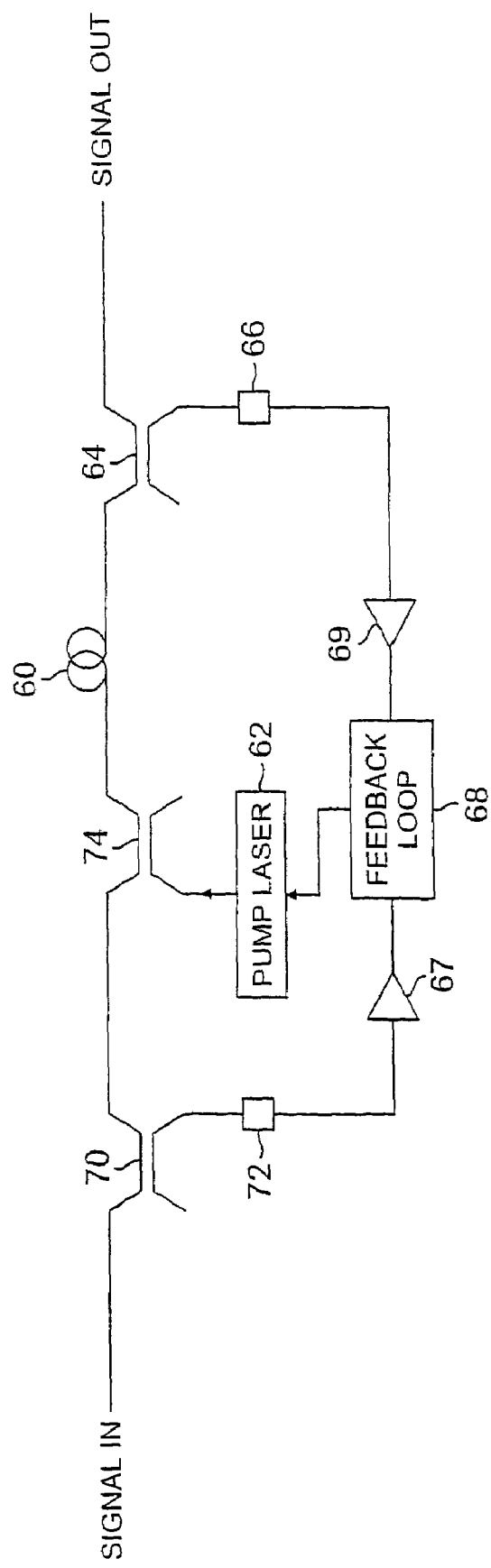
FIG. 6 shows one embodiment of an optical amplifier that incorporates an AGC arrangement in accordance with the present invention.

FIG. 6 shows one embodiment of an optical amplifier that incorporates an AGC arrangement in accordance with the present invention. As shown, the optical amplifier includes a rare-earth doped fiber such as an erbium doped fiber 60 and a pump laser 62 for supplying pump power to the doper fiber 60 via coupler 74. The feedback path includes a first wavelength selective coupler 64 located at the output of the erbium doped fiber 60, which taps a small portion of the ASE generated by the erbium doped fiber and directs it to a detector such as photodiode 66 to generate a photocurrent that is amplified by electronic amplifier 69 and which serves as a first electrical control signal. The first electrical control signal is applied to the feedback circuit 68. The feedback path also includes a second coupler 70 located at the input of the erbium doped fiber 60, which taps a small portion of the optical input signal and directs it to a detector such as photodiode 72 to generate a photocurrent that is amplified by electronic amplifier 67 and serves as a second electrical control signal, which is also applied to feedback circuit 68.

In operation, the inventive AGC algorithm monitors the ASE power and adjusts the pump power to keep the ASE power at its predetermined setpoint. The predetermined setpoint is determined in accordance with the gain and noise figure of the amplifier (see Equation 2). In addition, the signal input power is also monitored. The algorithm then adjusts the predetermined setpoint of the ASE power based on the value of the signal input power. While the value of the setpoint may be continuously adjusted as the signal input power changes, in some embodiments of the invention it may be preferable to establish a limited number of setpoints, each of which are applicable to a different range or window of signal input powers.

Depending on the initial conditions of the amplifier, if the ASE setpoint is varied too rapidly after a transient event (e.g., if the setpoint is changed from its lowest to its highest value without a brief dwell time at intermediate values), the inventive AGC algorithm may spike the pump power, leading to a sudden spike in the power of the output signal. In such cases it may be advantageous to ensure that the ASE setpoint is varied in a specific manner to match the temporal dynamics of the change in noise figure of the amplifier. One way to accomplish this is by simply stepping to a desired ASE power setpoint in some predetermined number of intermediate steps over a specified time period.

The response time of an erbium-doped fiber amplifier to changes in input power depends on the saturation state of the amplifier. Thus, the amplifier responds differently to sudden decreases in input power as opposed to sudden increases in input power. Accordingly, in some embodiments of the invention the magnitude of the ASE setpoint and the rate at which it is changed can be intentionally biased to accommodate signal power changes arising from dropped channels and not from added channels or vice versa.

The feedback circuit 68 shown in FIG. 6 may determine the necessary adjustments to the pump bias current from a variety of approaches. One common approach, known as proportional-integral-differential (PID) feedback calculates the bias current with the following equation:

$$I_b = g_1 \varepsilon + g_2 \int_0^t dt' \varepsilon(t') + g_3 \frac{d\varepsilon(t)}{dt} \quad (5)$$

where the first, second and third terms are proportional, integral and differential control, respectively. The $g_i$ coefficients are feedback gain coefficients for the various terms. The feedback circuit 68 may be configured in any manner known to those of ordinary skill in the art. For example, it may be implemented with either digital or analog electronics and in hardware or a combination of hardware and software.

The gain offset depends on the spectral content of the surviving channels. The average gain offset of all the surviving channels can be minimized by establishing an ASE setpoint that is matched to a particular wavelength, such as the 1550 nm wavelength located near the middle of the gain band. In this way, some wavelengths will have a slight over correction while others will have a slight under correction.

The particular embodiment of the invention illustrated in FIG. 6 shows a forward pumping construction in which pump light emitted by pump laser 62 travels through erbium-doped optical fiber 60 in the same direction as the wavelength-multiplexed optical signal. However, a backward pumping construction could also be used, where a pump laser provides pump light that travels through erbium-doped optical fiber 60 in the opposite direction as the wavelength-multiplexed optical signal. Further, a bi-directional pumping construction could be used, where two pump lasers provide pump light that travels through erbium-doped optical fiber 60 in both directions. The pump wavelength could be ~980 nm or ~1480 nm or a combination of the two wavelengths. Thus, the present invention is not intended to be limited to any specific type of directional pumping scheme, pumping wavelength, number of pumps or even the number of amplifier stages. In many cases the particular pumping arrangement that is employed will be dictated by stability and noise considerations.

Figure 7:
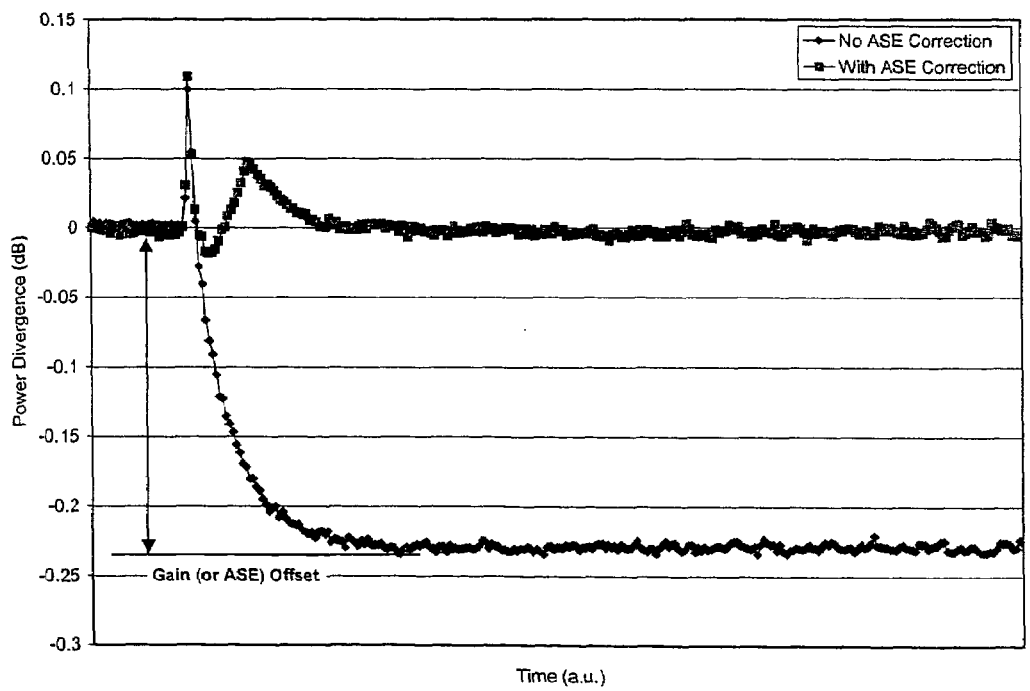
FIG. 7 shows the resultant power in a surviving channel after a transient event with and without implementation of the present invention.

FIG. 7 shows the resultant power in a surviving channel after a transient event with and without implementation of the present invention. As the data clearly indicates, the gain offset is substantially reduced when the present invention is employed.

Figure 8:
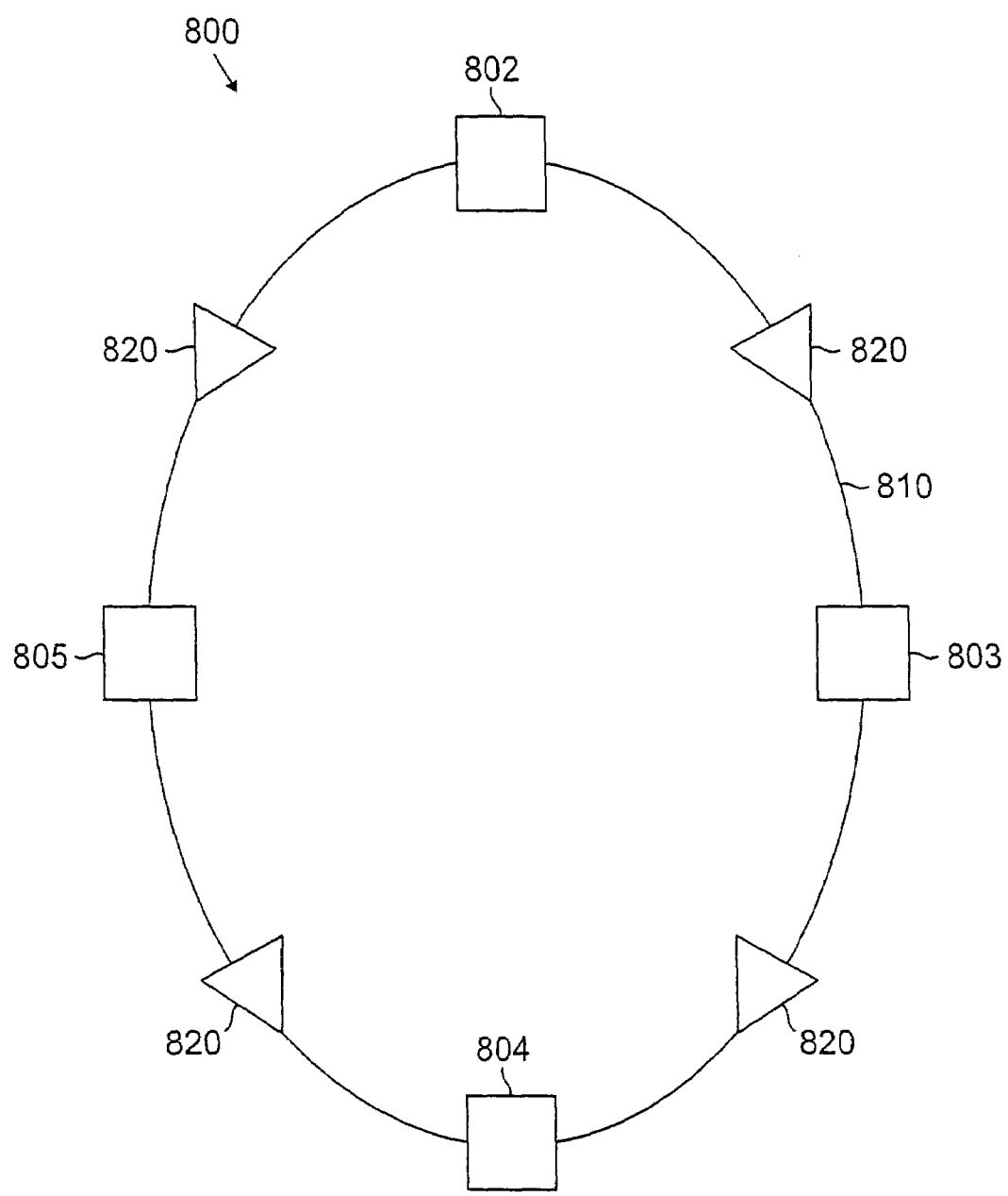
FIG. 8 shows a functional block diagram of an exemplary WDM ring network in which the present invention may be employed.

FIG. 8 shows a functional block diagram of an exemplary WDM ring network 800 in which the present invention may be employed. Ring network 800 includes a plurality of nodes 802–805 connected along a continuous, or looped, optical path 810. Each of these nodes is typically linked by a segment of optical fiber. Optical amplifiers 820 are located at appropriate points along the optical fiber segments. One or more of the optical amplifiers 820 may employ automatic gain control in accordance with the present invention. Nodes 802–805 generally include an optical switch such as an optical crossconnect or an optical add/drop multiplexer (OADM), user interfaces, and a network management element. The optical switches may be static switches in which particular wavelengths received on optical path 810 can only be received by predetermined ones of the local ports of the nodes. Alternatively, one or more of the optical switches may be reconfigurable optical switches in which any wavelength channel can be selectively dropped to any local port of the nodes. Such reconfigurable optical switches may be electro-optical elements, or, more preferably, all-optical elements. Examples of an all-optical reconfigurable switch are disclosed in U.S. patent application Ser. Nos. 09/571,833 and 09/691,812, which are hereby incorporated by reference in their entirety. The optical amplifiers of the present invention are particularly advantageous when employed in a WDM network having reconfigurable optical switches because of the power fluctuations that are likely to arise when the switches are reconfigured to add, drop or switch the path of the wavelengths. Of course, those of ordinary skill in the art will recognize that the present invention is equally applicable to other network topologies in addition to rings such as mesh or point-to-point topologies, for example.

What is claimed is:

1. A method for automatically controlling the gain of an optical amplifier, said method comprising the steps of:
    establishing a setpoint for ASE power within a given wavelength range generated by the optical amplifier;
    adjusting pump power supplied to the optical amplifier to maintain the ASE power at the established setpoint; and
    adjusting the setpoint for the ASE power based at least in part on changes in signal input power.

2. The method of claim 1 wherein the step of adjusting the pump power includes the steps of:
    generating a control signal based on a feedback error signal; and
    adjusting the pump power in accordance with the control signal.

3. The method of claim 2 wherein the feedback error signal is proportional to the difference between the setpoint for the ASE power and the power of ASE received at an output of the optical amplifier.

4. The method of claim 1 wherein the step of adjusting the ASE power setpoint includes the step of adjusting the ASE power setpoint so that a substantially constant optical amplifier gain is maintained.

5. The method of claim 1 wherein the setpoint for the ASE power is higher at low signal input powers and lower at high signal input powers.

6. The method of claim 1 wherein the setpoint for the ASE power is continuously adjustable.

7. The method of claim 1 wherein the setpoint for the ASE power is adjustable in a fixed number of discrete increments.

8. The method of claim 1 wherein the step of adjusting the ASE power setpoint includes the step of adjusting the ASE power setpoint at no more than a prescribed rate.

9. The method of claim 8 wherein the prescribed rate is different when the signal input power increases rather than decreases.

10. The method of claim 1 wherein the adjusting step is performed in accordance with a PID scheme.

11. The method of claim 1 wherein said optical amplifier is a rare-earth doped fiber amplifier.

12. The method of claim 11 wherein said rare-earth doped fiber amplifier is doped with erbium.

13. An optical amplifier with automatic gain control, comprising:
    a rare-earth doped fiber for imparting gain to an optical signal propagating therethrough;
    a pump source for supplying pump power to the rare-earth doped fiber;

a first optical power monitoring device configured for receiving a portion of ASE generated by the rare-earth doped fiber and converting said portion of the ASE to a first control signal;

a second optical power monitoring device configured for receiving a portion of the input optical signal and converting said portion of the input optical signal to a second control signal;

a controller receiving the first and second control signals and generating a bias current for driving the pump source, said bias current having a value based on maintaining the first control signal at a selected value that is based at least in part on the value of the second control signal.

14. The optical amplifier of claim 13 wherein said controller is a PID controller.

15. The optical amplifier of claim 13 wherein said first optical power monitoring device includes a first coupler located at the output of the doped fiber and a first photodetector for convening said portion of the ASE power to the first control signal.

16. The optical amplifier of claim 15 wherein said second optical power monitoring device includes a second coupler located at the input of the doped fiber and a second photodetector for converting said portion or the input power to the second control signal.

17. The optical amplifier of claim 13 wherein the selected value at which the control signal is maintained is chosen so that a substantially constant optical amplifier gain is maintained.

18. The optical amplifier of claim 13 wherein the selected value is higher at low signal input powers and lower at high signal input powers.

19. The optical amplifier of claim 13 wherein the selected value is continuously adjustable.

20. The optical amplifier of claim 13 wherein the selected value is adjustable in a fixed number of discrete increments.

21. The optical amplifier of claim 13 wherein the selected value is adjusted at no more than a prescribed rate.

22. The optical amplifier of claim 21 wherein the prescribed rate is different when the signal input power increases rather than decreases.

23. The optical amplifier of claim 13 wherein said rare-earth doped fiber amplifier is doped with erbium.

24. A WDM optical communication system, comprising:
a plurality of network nodes;
at least one optical communication link interconnecting said nodes;
at least one optical amplifier located along the communication link, said optical amplifier including:
a rare-earth doped fiber for imparting gain to an optical signal propagating therethrough;
a pump source for supplying pump power to the rare-earth doped fiber;
a first optical power monitoring device configured for receiving a portion of ASE generated by the rare-earth doped fiber and converting said portion of the ASE to a first control signal;
a second optical power monitoring device configured for receiving a portion of the input optical signal and converting said portion of the input optical signal to a second control signal;

a controller receiving the first and second control signals and generating a bias current for driving the pump source, said bias current having a value based on maintaining the first control signal at a selected value that is based at least in part on the value of the second control signal.

25. The optical amplifier of claim 24 wherein said controller is a PID controller.

26. The optical amplifier of claim 24 wherein said first optical power monitoring device includes a first coupler located at the output of the doped fiber and a first photodetector for converting said portion of the ASE power to the first control signal.

27. The optical amplifier of claim 24 wherein said second optical power monitoring device includes a second coupler located at the input of the doped fiber and a second photodetector for converting said portion of the input power to the second control signal.

28. The optical amplifier of claim 24 wherein the selected value at which the control signal is maintained is chosen so that a substantially constant optical amplifier gain is maintained.

29. The optical amplifier of claim 24 wherein the selected value is higher at low signal input powers and lower at high signal input powers.

30. The optical amplifier of claim 24 wherein the selected value is continuously adjustable.

31. The optical amplifier of claim 24 wherein the selected value is adjustable in a fixed number of discrete increments.

32. The optical amplifier of claim 24 wherein the selected value is adjusted at no more than a prescribed rate.

33. The optical amplifier of claim 32 wherein the prescribed rate is different when the signal input power increases rather than decreases.

34. The optical amplifier of claim 24 wherein said rare-earth doped fiber amplifier is doped with erbium.

35. The method of claim 1 wherein the step of establishing the ASE power setpoint includes the step of selecting a value for the ASE power setpoint based on the gain at a signal wavelength that minimizes gain offset across a signal bandwidth.

36. The optical amplifier of claim 13 wherein the selected value for the ASE power setpoint is based on the gain at a signal wavelength that minimizes gain offset across a signal bandwidth.

37. The optical amplifier of claim 24 wherein the selected value for the ASE power setpoint is based on the gain at a signal wavelength that minimizes gain offset across a signal bandwidth.

38. The optical amplifier of claim 24 wherein at least one of said network nodes includes an optical switch.

39. The optical amplifier of claim 24 wherein each of said plurality of network nodes includes an optical switch.

* * * * *

UNITED STATES PATENT AND TRADEMARK OFFICE
CERTIFICATE OF CORRECTION

PATENT NO. : 7,019,894 B1
APPLICATION NO. : 10/386902
DATED : March 28, 2006
INVENTOR(S) : Andrew John Stentz It is certified that error appears in the above-identified patent and that said Letters Patent is hereby corrected as shown below:

Specification, Col. 1, line 20, after "optical", insert - - , - -.

Specification, Col. 1, line 20, after last word "electrical", insert - - , - -.

Specification, Col. 2, line 13, after first word "added", insert - - , - -.

Specification, Col. 2, line 13, after "to", insert - - , - -.

Specification, Col. 2, line 14, after first word "from", insert - - , - -.

Specification, Col. 2, line 23, after first word "optical", change "signal to noise" to

- - signal-to-noise - -.

Specification, Col. 2, line 56, after "an", change "erbium doped" to - - erbium-doped - -.

Specification, Col. 2, line 57, after "3", insert - - , - -.

Specification, Col. 2, line 67, after "the", change "erbium doped" to - - erbium-doped - -.

Specification, Col. 5, line 34, after "powers", insert - - , - -.

Specification, Col. 5, line 52, after "figure", insert - - , - -.

Specification, Col. 6, line 8, after "offset", insert - - , - -.

Specification, Col. 6, line 22, after "an", change "erbium doped" to - - erbium-doped - -.

Specification, Col. 6, line 23, before last word "fiber", change "doper" to - - doped - -.

Specification, Col. 6, line 26, change "erbium doped" to - - erbium-doped - -.

Specification, Col. 6, line 27, after "the", change "erbium doped" to - - erbium-doped - -.

Specification, Col. 6, line 33, after "the", change "erbium doped" to - - erbium-doped - -.

Specification, Col. 8, line 19, after first word "rings", insert - - , - -.

UNITED STATES PATENT AND TRADEMARK OFFICE
CERTIFICATE OF CORRECTION

PATENT NO. : 7,019,894 B1  
APPLICATION NO. : 10/386902  
DATED : March 28, 2006  
INVENTOR(S) : Andrew John Stentz Page 2 of 2

It is certified that error appears in the above-identified patent and that said Letters Patent is hereby corrected as shown below:

Claim 16, Col. 9, line 25, after "portion" change "or" to - - of - -.

Signed and Sealed this

Twenty-second Day of August, 2006

JON W. DUDAS  
*Director of the United States Patent and Trademark Office*